INVENTOR.
GARY G. BATES
BY
Peter L. Klempay
AGENT

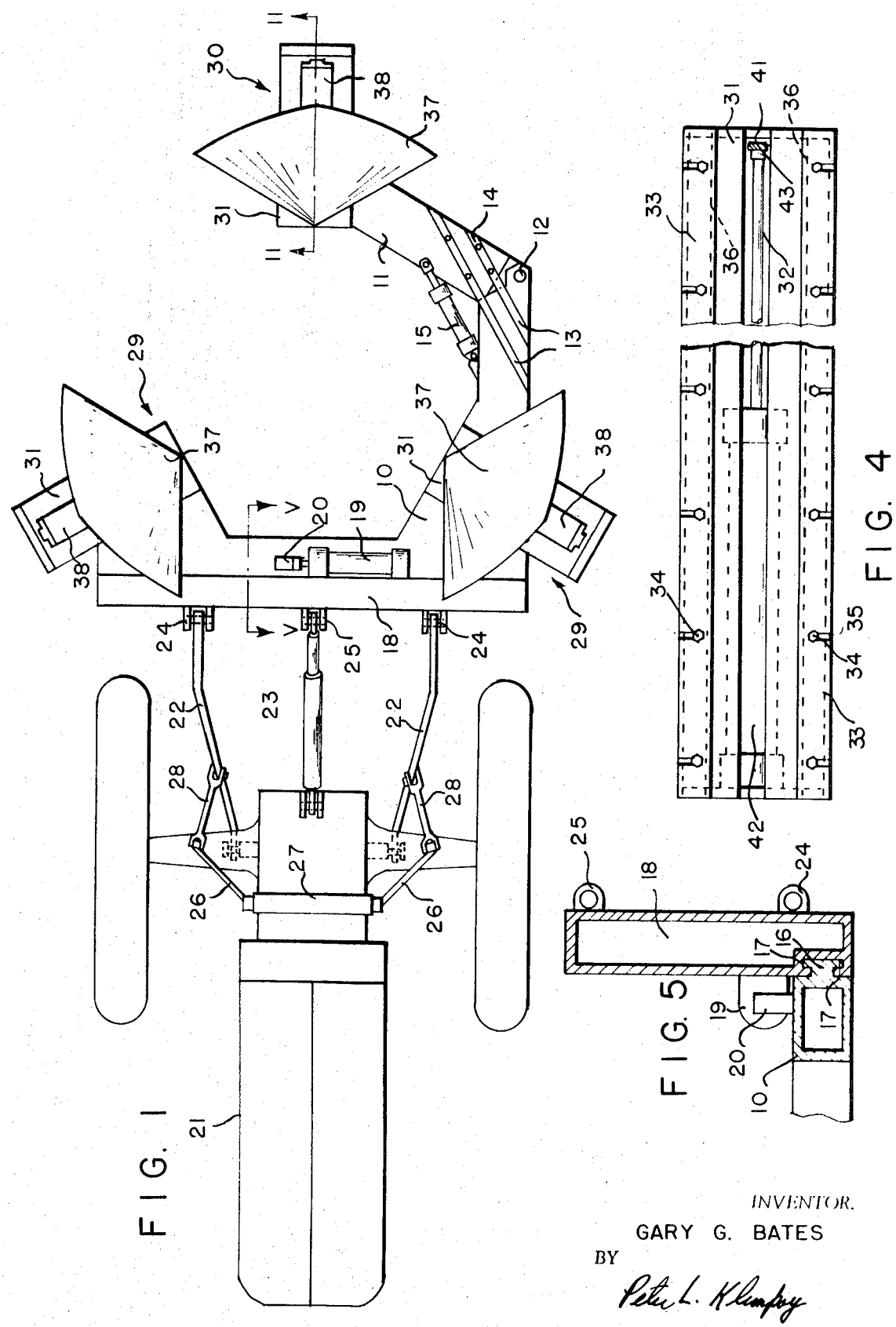

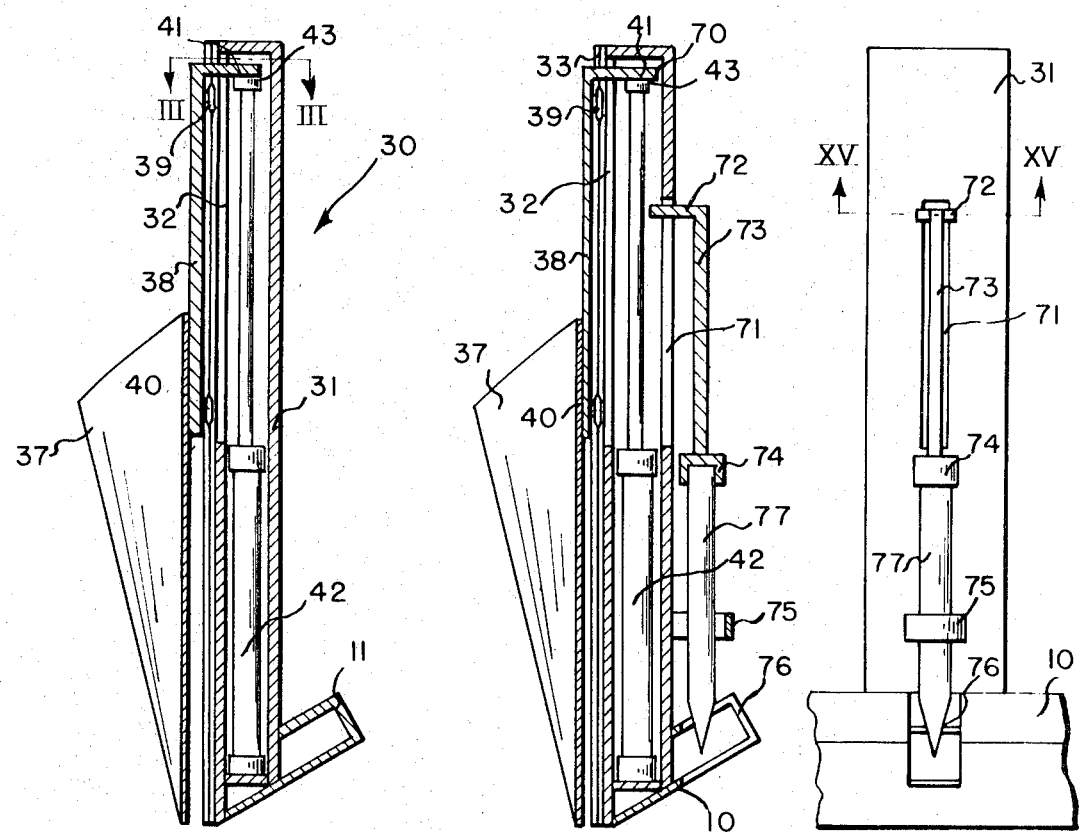
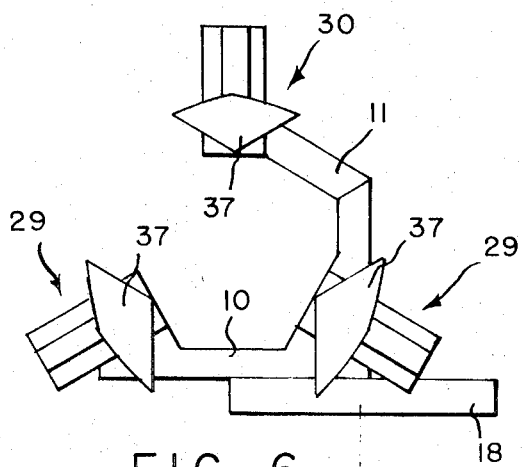
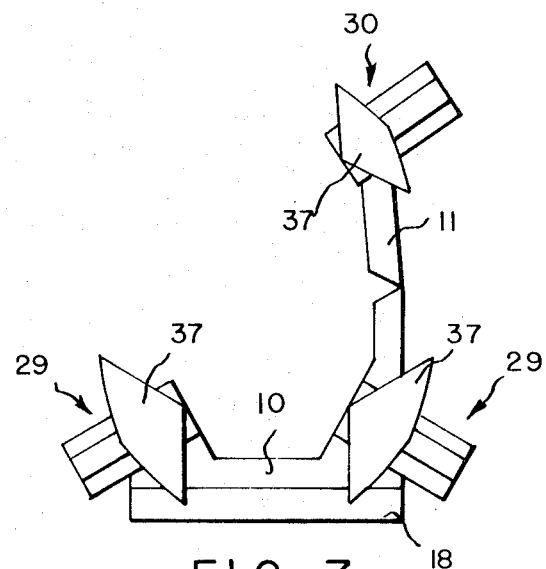

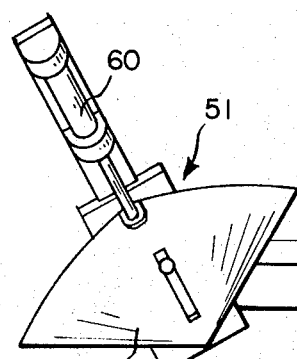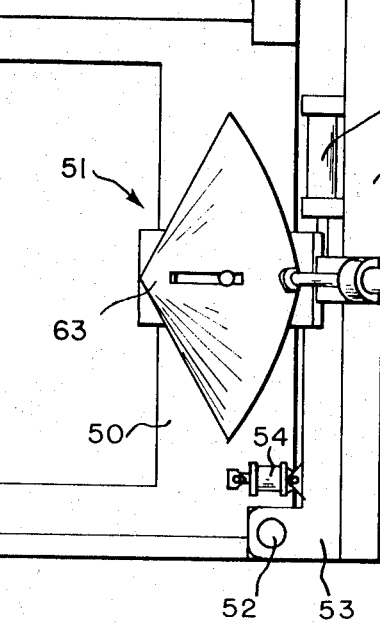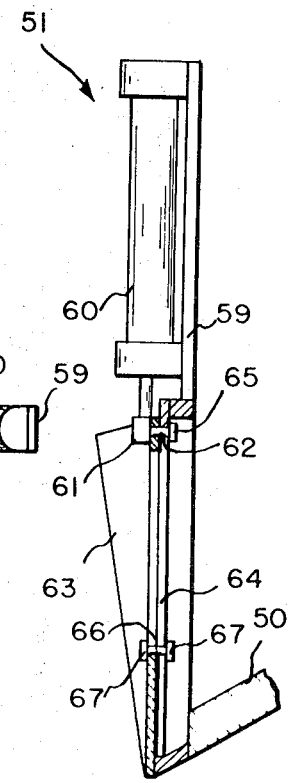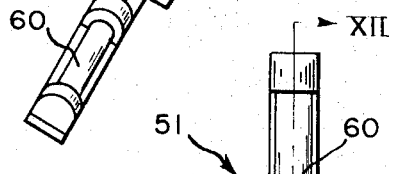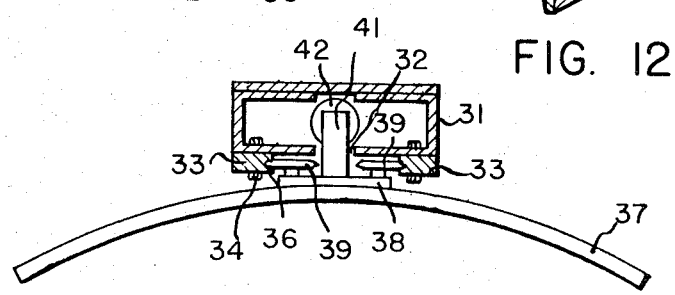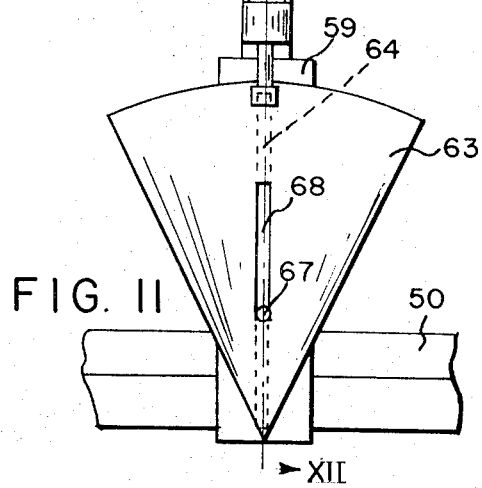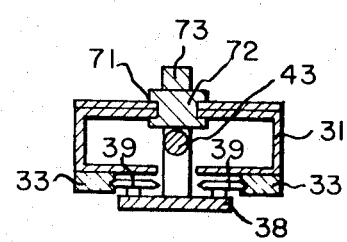

United States Patent Office 3,618,234
Patented Nov. 9, 1971

3,618,234
EXCAVATING AND TRANSPLANTING APPARA-
TUS FOR TREES AND THE LIKE
Gary G. Bates, Austintown, Ohio
(9735 Harrison Road, Romulus, Mich. 48174)
Filed Mar. 4, 1969, Ser. No. 804,131
Int. Cl. A01g 23/06
U.S. Cl. 37—2 R                                              5 Claims

ABSTRACT OF THE DISCLOSURE

A machine for digging and lifting trees and shrubs with a mass of earth about their root systems. In a first embodiment a generally L-shaped frame is slideably attached along one leg to a vertical frame which is in turn secured to a tractor, lift truck, or other vehicle. A pair of curved tapered blades are slideably mounted on housings secured to opposite ends of the leg of said frame which is attached to the vertical frame. A third blade is carried on a housing mounted on the free end of a horizontal subframe which is pivotally connected to the free end of the second leg of the L-shaped frame. Double-acting hydraulic cylinders are mounted within each of the housings and connected to the baldes to force the blades into and out of the ground. Grooved vertical rails are provided on the housings and guide wheels running in the grooves of the rails are provided on the blade supports. The housings may also be provided with stake driving attachments. In the second illustrated embodiment a C-shaped frame is provided and this frame is pivotally connected at one corner to a vertical subframe which is slideably mounted on a second vertical frame which in turn is attached to a tractor or other vehicle. A curved, tapered blade is slideably carried by a housing at each of the free ends of the C-shaped frame. A third blade is carried by a housing mounted at the center of the intermediate leg of the C-shaped frame. Pins moving in slots in the housings and the face of the blades guide the blades along their desired path of travel. In each embodiment the blades when forced into the ground form a cone-like confinement for the root system of the tree and, when the apparatus is lifted, the tree or shrub is lifted from the ground with its roots and with a mass of earth.

---

This invention relates to apparatus for digging and lifting trees and shrubbery preparatory to transplanting the same and more particularly to an improved plant digging and lifting device which may be used in confined areas without damage to surrounding trees or shrubbery.

When a tree or other large plant is moved from one location to another, a substantial mass of earth must be moved with the root system of the plant. It is also essential that this mass of earth remain intact about the roots of the plant at all times so as not to damage or destroy the delicate hair-like portions of the root system which provide the plant with its esssential water and nutriments. In the past, trees were excavated for transplanting by digging a circular trench around the tree either manually with picks and shovels or with the aid of a backhoe. This method, however, involves considerable time and labor and thus adds to the cost of transplanting the tree. Further, substantial, detrimental damage to the root system of the tree frequently occurs during this method of excavating. Machines have been proposed and are available which have a number, usually four, of toughshaped blades which are positioned at spaced points around the tree and then driven on converging paths into the ground to form a cone-like confinement for the root system and mass or ball of earth. When all of the blades have been driven fully into the earth the blades and their supporting framework are simultaneously lifted upwardly raising the tree and the ball of earth out of the hole. The tree may now be transplanted or the ball may be wrapped with burlap and wire, for example, and then moved to the desired location. These machines are capable of digging and lifting a tree in less time than the earlier manual methods, with substantially less labor, and with a minimum of disturbance of the earth forming the ball about the roots and thus with a minimum of damage to the root system of the tree. However, a large area free of trees, shrubbery, and any other obstructions must be provided around the plant to be moved in order to provide sufficient space for the truck carrying the machine to maneuver into position adjacent to the tree and to move the blades into their positions around the tree.

In nurseries trees and shrubs are normally grown close together in rows so as to allow for the raising of the maximum number of plants in a given area. The presently available transplanting machines cannot be used in such situations as there is not sufficient room to position the machine at a particular plant without damaging the adjacent plants nor is there normally sufficient room to pivot the outer blades together. As a result, the transplanting of trees and shrubs from nurseries is still done by the older, more costly manual methods. The same limitation of the usefulness of the present transplanting machinery is also encountered when it is desired to move a tree or shrub which is located close to a building, other shrubbery, or other obstructions.

It is the primary object of the present invention to provide an improved digging and lifting machine for the transplanting of trees and shrubs which may be used advantageously in confined areas. It is also an object of the present invention to provide a transplanting machine which may be positioned in an off-set manner relative to the tractor or truck on which the machine is mounted so that the machine may be used even in locations where it is impossible to position the tractor or truck immediately adjacent the plant to be moved. It is a further object of my invention to provide a transplanting device in which the frame carrying the moveable blades is of one piece construction and not subject to twisting or misalignment. A further object of the invention is the provision of a transplanting device having improved, simplified means for guiding the blades along their desired path of travel. Another object of the invention is the provision, in conjunction with the transplanting machine, of means for driving stakes into the ground surrounding the hole into which the plant is to be transplanted so that guy wires may be attached to the plant to prevent its being disturbed by high winds. It is also an object of the present invention to provide a device for lifting and transplanting trees and shrubs which is of economical and simple but rugged construction.

The above and other objects and advantages of the invention will become apparent upon consideration of the following specification and the accompanying drawings wherein there is shown a preferred embodiment of the invention.

In the drawings:

FIG. 1 is a plan view of a first embodiment of my invention attached to the rear of a tractor;

FIG. 2 is a sectional view taken along the line II—II of FIG. 1;

FIG. 3 is a horizontal sectional view taken along the line III—III of FIG. 2;

FIG. 4 is an elevational view of the blade supporting and actuating assembly of FIG. 2, with the blade removed for clarity;

FIG. 5 is a vertical sectional view taken along the line V—V of FIG. 1;

FIG. 6 is a plan view showing, schematically, the transplanting device of FIG. 1 in its offset position;

FIG. 7 is a plan view of the apparatus of FIG. 1, showing, schematically, the outer blade assembly in its open position to facilitate the positioning of the transplanting device around a tree;

FIG. 8 is a plan view showing a second embodiment of my invention;

FIG. 11 is a front elevational view of a blade assembly of the apparatus of FIG. 8 taken along the plane XI—XI of FIG. 9;

FIG. 12 is a sectional view taken along the line XII—XII of FIG. 11;

FIG. 13 is a sectional view similar to that of FIG. 2 but showing a further modification of my invention;

FIG. 14 is a rear elevational view of the structure shown in FIG. 13; and

FIG. 15 is a vertical sectional view taken along the line XV—XV of FIG. 14.

Figure 9:
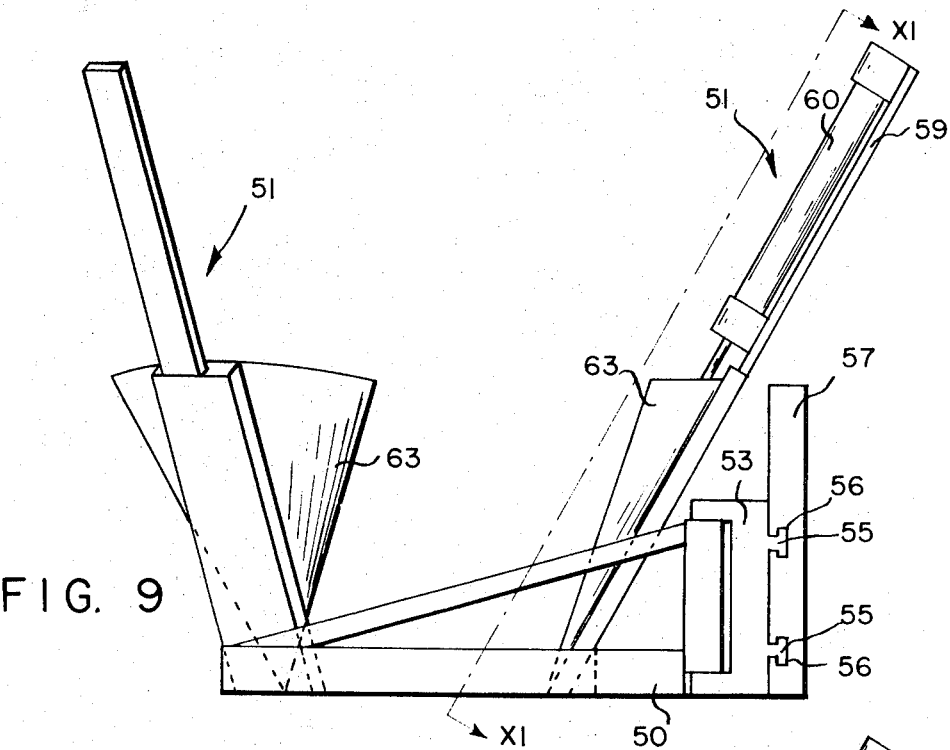
FIG. 9 is an elevational of the apparatus of FIG. 8.

FIGS. 1-5 illustrate a first embodiment of my invention. In this embodiment there is provided a main frame 10 and a subframe 11 which is connected to the main frame 10 by means of the hinge pin 12 and by straps 13 rigidly secured to the main frame 10, extending across the joint between the frames and secured to the subframe 11 by releasable pins or bolts 14. A hydraulic cylinder 15 is provided with one end secured to the main frame 10 and the opposed end to the subframe 11 to pivot the subframe about the pin 12. The main frame 10 is substantially L-shaped and the leg of this frame opposite the hinge pin 12 is provided on its outer edge with a horizontally extending guide 16 which is slideably received in ways 17 of a vertical frame 18. A hydraulic cylinder 19 is mounted on the vertical frame 18 and has its free operative end connected by means of bracket 20 to the main frame 10. The vertical frame 18 may be attached to any suitable vehicle such as a truck, lift truck, or tractor. In the embodiment illustrated FIG. 1 the vertical frame 18 is attached to a tractor 21 by means of a standard three-point hitch. The three-point hitch consists of a pair of drawbar links 22 connected at their forward ends to the tractor and, at 24, to the vertical frame 18. An adjustable stabilizing link is also connected to the vertical frame at 25 and, at its opposite end, to the tractor. Tractors of the type illustrated are also commonly provided with power means to raise and lower the links 22 whereby an implement or tool carried thereby may be raised or lowered for depth control and for transportation. Such power means may comprise a pair of interconnected arms 26 which are raised and lowered by a hydraulic mechanism shown schematically at 27 and which are connected at their outer free ends to links 22 by the links 28.

A pair of blade assemblies 29 are carried on the main frame 10 and a similar blade assembly 30 is carried on the outer free end of the subframe 11. The blade assemblies 29, 30 are positioned 120° from each other with the two blade assemblies 29 carried by the main frame 10 each being positioned 60° from the longitudinal axis of the tractor 21. As will be seen from FIGS. 2, 3, and 4, each of the blade assemblies 29, 30 consists of an elongated box-like member or housing 31 secured to the main frame 10 or subframe 11 at an acute angle. The box-like member 31 is provided with an elongated slot 32 extending vertically along at least the upper half of the housing 31. A pair of rails 33 are mounted on opposite sides of the slot 32 and extend the entire height of the housing 31. These rails are preferably connected to the housing 31 by means of bolts 34 passing through slots 35 in the rails 33. The facing edges of the rails 33 are provided along their entire length with V-shaped grooves 36. A curved and tapered blade 37 is connected at its upper end to an elongated plate 38. Journaled, preferably with anti-friction bearings, to the opposite side of the plate 38 at its upper and lower ends are pairs of wheels 39 and 40. The circumferential profile of the wheels 39 and 40 is complementary to the V-shaped grooves 36 of the rails 33. The pairs of wheels 39 and 40 ride in the grooves 36 of the rails 33 and thus guide the plate 38 and blade 37. The upper end of the plate 38 is provided with a rearwardly projecting arm 41 which extends through the slot 32 in the front surface of the housing 31. A double-acting hydraulic cylinder 42 is mounted within the housing 31 and has its operative end 43 connected to the arm 41.

Referring now to FIGS. 8-12 the second illustrated embodiment of my invention will now be described. In this embodiment there is provided a rigid C-shaped frame 50. Blade assemblies 51 are carried at the extremities of the frame 50 and at the midpoint of the intermediate leg of the frame. At one end of the intermediate leg of the frame 50 the frame is connected by means of a hinge pin 52 to a vertical subframe 53. A hydraulic cylinder 54 is connected at one end to the subframe 53 and at its opposite end to the main frame 50 to pivot the main frame relative to the subframe 53 about the hinge pin 52. Horizontal guides 55 on the side of the subframe 53 opposite the main frame 50 are slideably received in ways 56 provided in a vertical frame 57. The vertical frame 57 may be connected to a tractor as shown in FIG. 1 and described above or to a lift truck or other suitable vehicle. A hydraulic cylinder 58 is mounted on the vertical frame 57 and has its operative end connected to the subframe 53. When the hydraulic cylinder 58 is actuated the subframe 53 and main frame 50 with the blade assembly 51 carried thereby are displaced laterally relative to the vertical frame 57 and the vehicle by which it is mounted. As shown in FIGS. 11 and 12 the blade assembly 51 is comprised of an upright member 59 which is secured to the main frame 50 at an acute angle thereto. A double-acting hydraulic cylinder 60 is mounted on the upper end of the upright member 59 and has its operative end 61 connected by meeans of a pin 62 to the upper end of a curved and tapered blade 63. The upright member 59 is provided with an elongated vertically extending slot 64 extending along substantially the entire lower half of the member 59. The pin 62 extends through the slot 64 and is retained by an enlarged head portion 65. A second pin 66 having head portions 67 extends through the slot 64 and through an elongated vertical slot 68 in the face of the blade 63.

Figure 10:
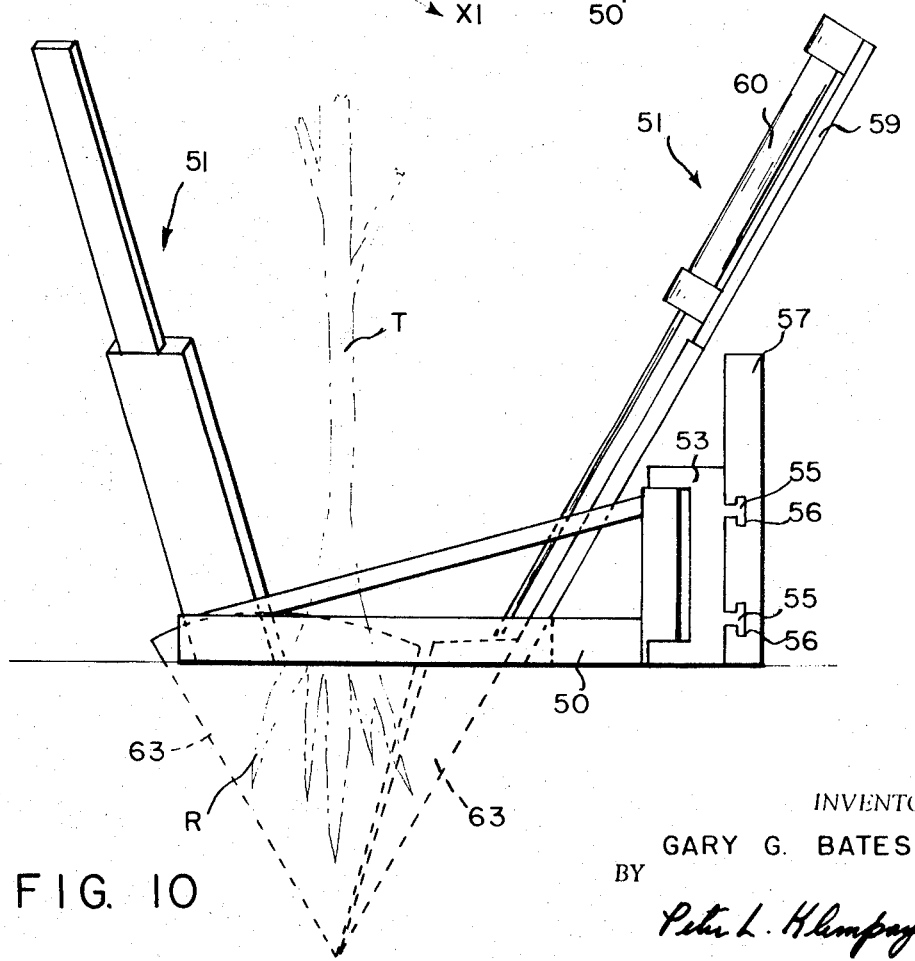
FIG. 10 is an elevational similar to that of FIG. 9 but showing the blades in their extended positions.

When a tree or shrub is to be moved from the location in which it has grown, the transplanting device is maneuvered around the tree or shrub so that the center of the plant is located equidistant from the three blades of the transplanting apparatus. As will be seen from FIGS. 6 and 7, the arrangements for displacing the transplanting apparatus relative to the longitudinal axis 80 of the vehicle and for pivoting the outer blade blade assembly 30 permits the apparatus to be readily positioned around a plant even within the narrow confines of a nursery row, The pivoting arrangement of the second described embodiment permits the frame 50 and blades 63 to be positioned about a plant with the frame 50 located at right angles to the vertical frame 57. As the frame 50 may also be displaced laterally relative to the vertical frame 57 and the carrying vehicle, it is possible to position this device about a tree or shrub in a very confined area. When the transplanting device has been properly positioned about the plant to be moved, the hydraulic cylinders 42 or 60 are actuated to force the blades 37 or 63 into the ground around the tree or shrrub. As shown in FIG. 10, when the blades are forced fully into the ground they meet to form a cone-like confinement about the root system R of the tree T. As the blades progress into the ground they shear off any roots protruding beyond their path of travel while maintaining the soil around the root system R in close contact with the remaining roots. Preferably, the hydraulic cylinders are operated separately and in rotation so as to force each blade uniformly into the ground by a series of short increments. When the blades have fully entered the ground, the lifting apparatus of the vehicle on which the transplanting device is mounted is actuated raising the transplanting device and the tree with its root system and ball of earth from the ground. The tree may now be moved to its desired location while carried by the blades of the transplanting device or the blades may be withdrawn and the root system and its accompanying ball of earth warpped in burlap, for example, for later transplanting.

It is readily apparent that while the blades are being moved into the ground they must be securely guided so that they are not deflected from their paths of travel and thereby fail to form the necessary cone-like confinement for the root system of the tree or shrub being transplanted. In the first described embodiment the wheels 39 and rails 33 serve to guide the blade and prevent any deflection from the desired path of travel. In the second described embodiment the pins 62 and 66 moving in the groves 64 and 68 restrain the blade from moving out of the desired path of travel.

The device of my invention may also be used to prepare the hole into which the plant is to be placed and, as the device creates a hole of the same size and shape as the mass of earth and roots of the plant being moved, it is apparent that such an arrangement is highly advantageous as it reduces to a minimum the amount of backfilling required. When large trees are being transplanted it is preferable after the tree has been positioned to fasten it by means of wires to stakes in the ground surrounding the tree so that the tree is not adversely affected by high winds. In FIGS. 13, 14, and 15, I show a further modification of my invention which when used to prepare a site for the transplanting of a plant also positions the desired stakes in the ground surrounding the hole into which the tree is to be placed. As in the first described embodiment, I provide a housing 31 with a slot 32 in its front surface and have a pair of grooved rails 33 located on opposite sides of the slot. A curved and tapered blade 37 is mounted on an elongated plate 38 which is provided with pairs of wheels 39 and 40 which ride in the grooves of the rails 33. The upper end of the plate 38 is provided with a leg 41 which projects through the opening 32 and is connected to the operative end 43 of a hydraulic cylinder 42 mounted within the housing 31. In this embodiment the leg 41 projects beyond the end 43 of the cylinder 42 providing a rearwardly projecting lug 70. A second vertical slot 71 is provided in the rear face of the housing 31. Slideably received within the slot 71 is a block 72. The block 72 projects inwardly into the housing 31 a sufficient distance to interfere with the lug 70 of the leg 41 mounted at the upper end of the actuating rod 43 of the hydraulic cylinder 42. The outer end of the block 72 is connected by a rod 73 to a downwardly opening cup-like member 74. The frame member 10 immediately behind the housing 31 is provided with a rearwardly opening notch 76 and the housing 31 is provided with a retaining bracket 75 along the line of travel of the cup-like member 74. When it is desired to drive a stake into the ground while excavating for the transplanting of a plant, a stake 77 is positioned within the retaining bracket 75 of the frame 10 and has its upper end fitted into the cup-like member 74. When the hydraulic cylinder 42 is retracted pulling the blades 37 into the ground the rearwardly projecting lug of the leg 41 is caught by the block 72 and forces the block 72 and the rod 73 along with the cup-shaped member 74 toward the ground. The stake 77 is thus forced into the ground at an acute angle and, when the tree has been positioned in the hole is ready for the attachment of guy wires.

It will be readily apparent that changes may be made in and to the above described embodiments of my invention without departing from the scope thereof. For example, the rails 33 may be rigidly secured to the face of the housing 31 and the bearings mounting the pairs of wheels 39 and 40 may be of the eccentric type to permit adjustment as the rails and wheels become worn. Likewise, the means for mounting and guiding the blades may be varied so long as the blades are restrained to travel along their converging paths to form the cone-like confinement with the root system of the plant being transplanted.

It should be readily apparent that I have invented a transplanting device which is characterized by being readily maneuverable into a working position even within the confines of a narrow space. It should also be apparent that my device is of simple yet rugged construction. In the first described embodiment the location of the two blade assemblies 29 close to the vertical member 18 by which the device is attached to a tractor or other vehicle and the location of the blade actuating cylinders in lower ends of their housing provides a device which has a low center of gravity located close to the mounting vehicle so that the device is not top heavy or difficult to maneuver. The provision of means for laterally displacing the transplanting device relative to the vehicle on which it is mounted and for pivoting either a portion of or the entire frame of the transplanting device enables the device to be maneuverd within narrow confines. It should also be noted that by positioning the blade assemblies 29 as shown in FIG. 1 that these assemblies do not project far beyond the limits of the tractor or other vehicle and thus may be readily moved into and out of narrow rows without damage to the surrounding trees or other plants.

I claim:

1. Apparatus for excavating a tree, shrub, or other plant, comprising:
   a horizontal, C-shaped main frame; and
   a plurality of blade assemblies secured to the main frame and positioned at equally spaced intervals in a circular pattern, each blade assembly having
      a subframe secured to the main frame,
      a blade slideable on the subframe, the blades being curved and tapered so as to form a conical shell when the blades of all the subframe are in their lowermost positions,
      a pair of vertically extending rails mounted on the subframe, the rails being in spaced, parallel relation to one another,
      an elongated plate secured at its lower end to the upper portion of the blade and extending in parallel relation to the rails,
      a first pair of wheels journaled at the upper end of the plate and running on the rails,
      a second pair of wheels journaled at the lower end of the plate and also running on the rails, and
      a hydraulic cylinder carried by the subframe and operatively connected to the plate.

2. Apparatus according to claim 1 wherein each assembly further includes
   mean mounted on the subframe for loosely holding a stake with the longitudinal axis thereof in substantially parallel alignment with the direction of movement of the blade,
   a stake engaging member slideably carried on the subframe and having means for engaging the upper end of the stake, and
   means connecting the stake engaging member to the moveable portion of the hydraulic cylinder during at least a portion of the movement of the blade.

3. Apparatus according to claim 1 further including:
   means to adjust the lateral position of said rails relative to said pairs of wheels.

4. Apparatus for excavating a tree, shrub, or other plant, comprising:
- a horizontal, C-shaped main frame; and
- a plurality of blade assemblies secured to the main frame and positioned at equally spaced intervals in a circular pattern, each blade assembly having
  - a subframe secured to the main frame and having a slot extending longitudinally along a portion of the subframe;
  - a blade slideable on the subframe, the blades being curved and tapered so as to form a conical shell when the blades of all of the blade assemblies are in their lowermost positions, each blade having a slot extending longitudinally along a portion thereof,
  - a first pin affixed to the blade above the slot therein and slideably received in the slot in the subframe,
  - a second pin slideably received in the slots in the blade and in the subframe, and
  - a hydraulic cylinder carried by the subframe and operatively connected to the blade.

5. In apparatus for excavating plants such as trees, shrubs, and the like having frame means adapted to surround the plant, a plurality of blades carried by the frame means and means for driving the blades into the ground on converging paths to form an enclosure surrounding the roots of the plant, the improvement comprising:
- stake holding and guiding means associated with at least certain of the blades, each such means being adapted to guide a stake for movement parallel to the movement of the respective blade;
- a stake engaging member associated with each holding and guiding means for engaging the upper end of a stake carried by the holding and guiding means, the member being capable of movement parallel to the movement of the respective blade; and
- means connecting the member to the means for driving the blade during at least a portion of the movement of the blade.

References Cited

UNITED STATES PATENTS

| | | | |
|---|---|---|---|
| 2,613,912 | 10/1952 | Jordan | 37—2 X |
| 2,729,493 | 1/1956 | Engel | 294—50.8 |
| 3,017,707 | 1/1962 | Sigler et al. | 37—2 R |
| 3,017,709 | 1/1962 | Sigler | 37—2 R |
| 3,163,944 | 1/1965 | Whitcomb | 37—2 R |
| 3,364,601 | 1/1968 | Korenek | 37—2 R |
| 3,427,734 | 2/1969 | Eberhart | 37—2 R |
| 3,460,277 | 8/1969 | Grover et al. | 37—2 R |

ROBERT E. PULFREY, Primary Examiner

R. E. SUTER, Assistant Examiner